(12) United States Patent
Haruna

(10) Patent No.: US 10,623,645 B2
(45) Date of Patent: Apr. 14, 2020

(54) IMAGE BLUR CORRECTION DEVICE, METHOD OF CONTROLLING THEREOF, AND IMAGING APPARATUS

(71) Applicant: CANON KABUSHIKI KAISHA, Tokyo (JP)

(72) Inventor: Kohta Haruna, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/157,262

(22) Filed: Oct. 11, 2018

(65) Prior Publication Data

US 2019/0124267 A1     Apr. 25, 2019

(30) Foreign Application Priority Data

Oct. 23, 2017  (JP) ................................. 2017-204470

(51) Int. Cl.
*H04N 5/232* (2006.01)
*G06T 5/00* (2006.01)
(Continued)

(52) U.S. Cl.
CPC ........... *H04N 5/23287* (2013.01); *G06T 7/20* (2013.01); *H04N 5/23245* (2013.01);
(Continued)

(58) Field of Classification Search
CPC ........... H04N 5/23287; H04N 5/23254; H04N 5/23245; H04N 5/23299; H04N 5/23293; H04N 5/23222; H04N 5/23251; H04N 5/23261; H04N 5/23264; G06T 5/00; G06T 5/001; G06T 5/003; G06T 5/20; G06T 7/20

USPC ....... 348/208.99, 208.1, 208.2, 208.3, 208.5, 348/208.12, 208.13, 208.16, 222.1, 348/154–157, 169–172; 382/103, 107; 396/52, 55, 104; 375/240.16, 240.22
See application file for complete search history.

(56) References Cited

U.S. PATENT DOCUMENTS 5,648,815 A * 7/1997 Toba ...................... H04N 5/228
348/208
10,212,348 B2 * 2/2019 Kuchiki ............. H04N 5/23287
348/208.11
(Continued)

FOREIGN PATENT DOCUMENTS

JP         2015-161730 A      9/2015

*Primary Examiner* — Marly S Camargo
(74) *Attorney, Agent, or Firm* — Venable LLP

(57) ABSTRACT

An imaging apparatus includes a correction lens for changing an image forming position of a subject image on an imaging unit, and performs an image blur correction by drive control of the correction lens. A subject angular velocity calculation unit calculates an angular velocity of the subject with respect to the imaging apparatus from a focal distance of an imaging optical system, a motion of the imaging apparatus, and a motion of the subject. A panning imaging control unit performs control for supporting panning imaging of a user. A subject angular velocity determination unit switches a method of calculating the angular velocity of the subject at a time of an exposure according to whether an autofocus state of the imaging optical system is in focus or out of focus on the basis of a change over time of the angular velocity of the subject, a time at which the angular velocity is calculated, and an imaging time.

19 Claims, 7 Drawing Sheets

(51) Int. Cl.
*G06T 5/20* (2006.01)
*G06T 7/20* (2017.01)
*H04N 19/52* (2014.01)

(52) U.S. Cl.
CPC ..... *H04N 5/23254* (2013.01); *H04N 5/23258* (2013.01); *H04N 5/23261* (2013.01); *H04N 5/23299* (2018.08); *H04N 5/23212* (2013.01)

(56) References Cited

U.S. PATENT DOCUMENTS

| | | | |
|---|---|---|---|
| 10,230,897 B2* | 3/2019 | Ikeda | H04N 5/23254 396/55 |
| 2008/0111889 A1* | 5/2008 | Fujita | H04N 5/23219 348/208.6 |
| 2010/0157073 A1* | 6/2010 | Kondo | H04N 5/23248 348/208.6 |
| 2013/0308005 A1* | 11/2013 | Takahashi | H04N 5/23212 348/208.99 |
| 2014/0184836 A1* | 7/2014 | Watanabe | H04N 5/23264 348/208.5 |
| 2015/0002684 A1* | 1/2015 | Kuchiki | H04N 5/23232 348/208.6 |
| 2017/0134649 A1* | 5/2017 | Wakamatsu | H04N 5/23229 382/103 |
| 2017/0155842 A1* | 6/2017 | Takayanagi | H04N 5/23267 348/208.1 |
| 2018/0255245 A1* | 9/2018 | Miyazawa | H04N 5/23254 348/208.1 |

* cited by examiner

IMAGE BLUR CORRECTION DEVICE, METHOD OF CONTROLLING THEREOF, AND IMAGING APPARATUS

BACKGROUND OF THE INVENTION

Field of the Invention

The present invention relates to a technique for correcting an image blur of a subject.

Description of the Related Art

Panning imaging is a photographing technique expressing a feeling of speed in a moving subject, and an object of panning imaging is to cause a photographer to perform panning of a camera according to a motion of a moving body to cause a background image to flow by stopping an image of the moving body. In a case where the panning speed when the photographer performs panning with respect to the motion of the subject is too fast or too slow, a difference between a motion speed of the subject and a planning speed occurs, and there is a possibility that a blur will occur in a subject image.

A device disclosed in Japanese Patent Laid-Open No. 2015-161730 corrects a blur (a subject blur) of a subject by moving a part of an imaging optical system or an imaging unit during an exposure on the basis of a relative angular velocity of the subject with respect to an imaging apparatus calculated before an exposure and an angular velocity of the imaging apparatus during the exposure obtained from an angular velocity sensor. The relative angular velocity of the subject with respect to the imaging apparatus is calculated by a motion amount on an image surface of the subject detected from temporarily successive images and an output of the angular velocity sensor.

In the related art, there is a possibility that a large error will occur in the detected motion amount depending on a state of the image used when a motion of the subject is detected in the image blur correction. As a general method of detecting the motion of the subject on the image surface, there is a vector detection method using a template matching method. In this method, in a case where the image is blurred, the motion amount may not be accurately calculated.

Incidentally, a motion assumed in Japanese Patent Laid-Open No. 2015-161730 is a uniform motion in a straight line that is a typical motion of an object to be panned. In this case, it is known that a subject angular velocity measured by the camera does not become a constant value and becomes a motion having an angular acceleration. Therefore, in a case where a time lag occurs between a calculation time point of the angular velocity of the subject and a time point at which actual imaging is performed, it is necessary to calculate the subject angular velocity at the time of the exposure taking the acceleration in the angular velocity into account and perform correction with an appropriate operation using the motion of an image blur correction lens. For example, it may be assumed that the acceleration is predicted on the basis of a temporal change of the subject angular velocity calculated from the vector detected from an image that is not focused on the subject. In this case, since an angular acceleration that is not accurate is calculated, a deviated angular velocity may be obtained as compared with a case where the angular velocity is calculated without considering the acceleration. As a result, the image blur correction is performed using an erroneous angular velocity, and thus there is a possibility that an image blur correction performance will be degraded.

SUMMARY OF THE INVENTION

The present invention performs highly accurate image blur correction in photographing a subject that is a moving body.

A device of an embodiment of the present invention is an image blur correction device for performing an image blur correction by correction unit on an image of a subject formed through an imaging optical system. The image blur correction device includes acquisition unit configured to acquire information on a focal distance of the imaging optical system, calculation unit configured to calculate an angular velocity of the subject with respect to the image blur correction device based on the focal distance, a shake detection signal detected by first detection unit, and motion information of the subject detected by second detection unit, determination unit configured to determine the angular velocity of the subject at a time of an exposure based on a plurality of angular velocities acquired from the calculation unit and a time at which the image used when the angular velocity is calculated is generated, and control unit configured to control the correction unit according to a correction amount calculated based on the angular velocity determined by the determination unit. The determination unit switches between first processing of determining the angular velocity of the subject at the time of the exposure based on change over time of a plurality of angular velocities of the subject calculated by the calculation unit and a second processing of determining the angular velocity of the subject at the time of the exposure by averaging the plurality of angular velocities of the subject calculated by the calculation unit.

Further features of the present invention will become apparent from the following description of embodiments with reference to the attached drawings.

DESCRIPTION OF THE EMBODIMENTS

Hereinafter, the present invention will be described in detail according to each embodiment. An example of an imaging apparatus having an image blur correction device will be described, but the example is able to be applied to an optical apparatus such as an interchangeable lens having an image blur correction function and various kinds of electronic apparatuses including an imaging unit.

First Embodiment

An example in which panning imaging is performed by an imaging apparatus having an image blur correction function will be described with reference to FIGS. 1 to 6. Hereinafter, a function of supporting the panning imaging of a user is referred to as a "panning imaging assist" and a photographing mode in which control of the panning imaging assist is performed is referred to as a "panning imaging assist mode".

Figure 1:
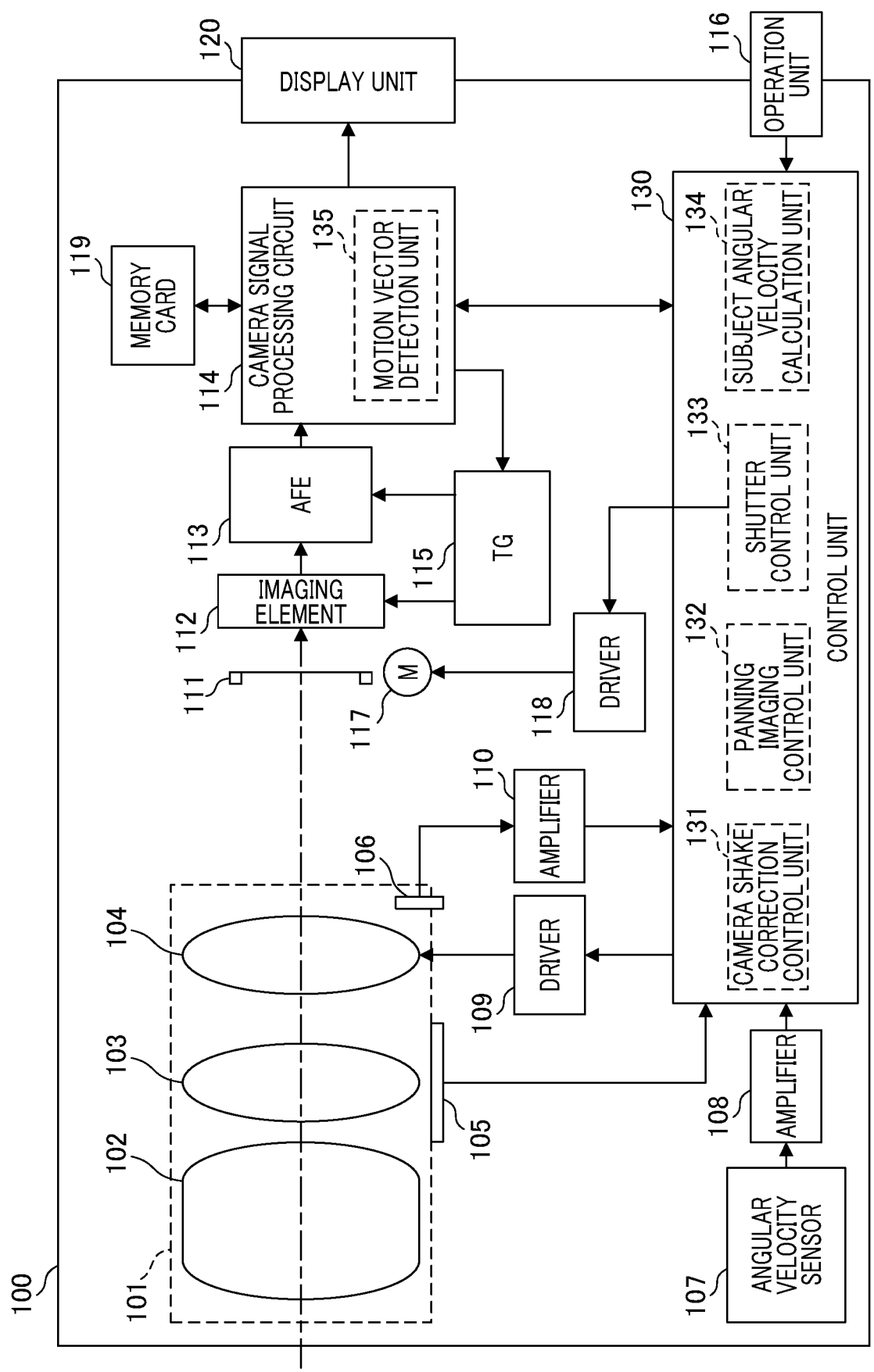
FIG. 1 is an overall configuration diagram of an imaging apparatus of the present embodiment.

FIG. 1 is a diagram illustrating a configuration of an imaging apparatus 100 and illustrates a lens integrated camera. A photographing lens unit 101 has a main imaging optical system 102, a zoom lens group 103, and a shift lens group 104, and includes an optical member such as a diaphragm in addition to the main imaging optical system 102, the zoom lens group 103, and the shift lens group 104, but descriptions thereof will be omitted. The main imaging optical system 102 has a fixed lens group or a focus lens for performing a focus adjustment. The zoom lens group 103 is a movable lens of which a focal distance is changeable. The shift lens group (hereinafter, also referred to as a shift lens) 104 is a correction lens for correcting an image blur with respect to an optical axis due to camera shake or the like. The shift lens is a movable lens that optically corrects the image blur by moving in a direction perpendicular to the optical axis.

A zoom encoder 105 detects a position of the zoom lens group 103. A position sensor 106 detects a position of the shift lens group 104. An angular velocity sensor 107 configures a shake detection unit that detects a shake of the imaging apparatus 100 and outputs an angular velocity detection signal that is a shake detection signal to an amplifier 108. The amplifier 108 amplifies an output of the angular velocity sensor 107 and outputs a signal after the amplification to a control unit 130.

The control unit 130 includes a microcomputer and controls each unit of the imaging apparatus 100. An amplifier 110 amplifies the output signal of the position sensor 106 and outputs the signal after the amplification to the control unit 130. The control unit 130 outputs a drive instruction of the shift lens to a driver 109 on the basis of a position detection signal of the shift lens. The driver 109 moves the shift lens according to the drive instruction and performs an image blur correction operation.

The imaging apparatus 100 includes a shutter 111 and an imaging element 112. The shutter 111 controls an exposure time of the imaging element 112. The imaging element 112 is an image sensor using a complementary metal oxide semiconductor (CMOS) element or the like. The imaging element 112 receives light from a subject of which an image is formed through an imaging optical system and outputs an electrical signal by a photoelectric conversion. An analog signal processing circuit (AFE) 113 acquires and processes an output of the imaging element 112, and a camera signal processing circuit 114 further processes an analog signal after the processing to generate an image signal. A timing generator (TG) 115 is a circuit for setting an operation timing of the imaging element 112 or the analog signal processing circuit 113.

An operation unit 116 includes a power switch, a release switch, a selection switch for a panning imaging assist mode, and the like. A memory card 119 is an example of a recording medium for recording photographed image data. Image data from the camera signal processing circuit 114 is recorded in the memory card 119. A display unit 120 includes a display device such as a liquid crystal panel and performs a monitoring display of an image to be photographed by the user or a display of an operation menu screen or the like.

The camera signal processing circuit 114 includes a motion vector detection unit 135. The motion vector detection unit 135 detects a motion vector from a plurality of pieces of image data of which imaging times are different, based on an output of the analog signal processing circuit 113. Information on the motion vector is transmitted to the control unit 130.

The control unit 130 of the present embodiment includes first to third control units, and each unit is configured by a central processing unit (CPU) and a software program. The first control unit is camera shake correction control unit 131, and performs camera shake correction control by moving the shift lens. The second control unit is a panning imaging control unit 132 that performs control for the panning imaging assist. The third control unit is a shutter control unit 133 that controls the shutter 111, and controls a shutter driving motor 117 through a driver 118 to perform a shutter operation. In addition, the control unit 130 includes a subject angular velocity calculation unit 134 that calculates an angular velocity of a main subject. Details of each unit will be described later. The control unit 130 also performs focus lens control, aperture control, and the like in addition to these, but the focus lens control, the aperture control, and the like will be omitted for the sake of simplicity of illustration. In addition, for example, in the camera shake correction, the detection and the correction are performed with respect to two orthogonal axes of a horizontal direction and a vertical direction, but since the configurations of the detection and the correction are the same for each axis, only the configuration for one axis will be described.

In a case where the user turns on the power of the imaging apparatus 100 by the operation unit 116, the control unit 130 detects a state change thereof and performs power source supply to each circuit of the imaging apparatus 100 and an initialization setting is performed. At a normal mode time at which the panning imaging assist mode is not set, the angular velocity sensor 107 detects a shake applied to the imaging apparatus 100 due to the camera shake or the like, and the camera shake correction control unit 131 performs drive control of the shift lens group 104 and performs the camera shake correction operation based on the shake detection signal. Camera shake correction function will be described with reference to FIG. 2.

Figure 2:
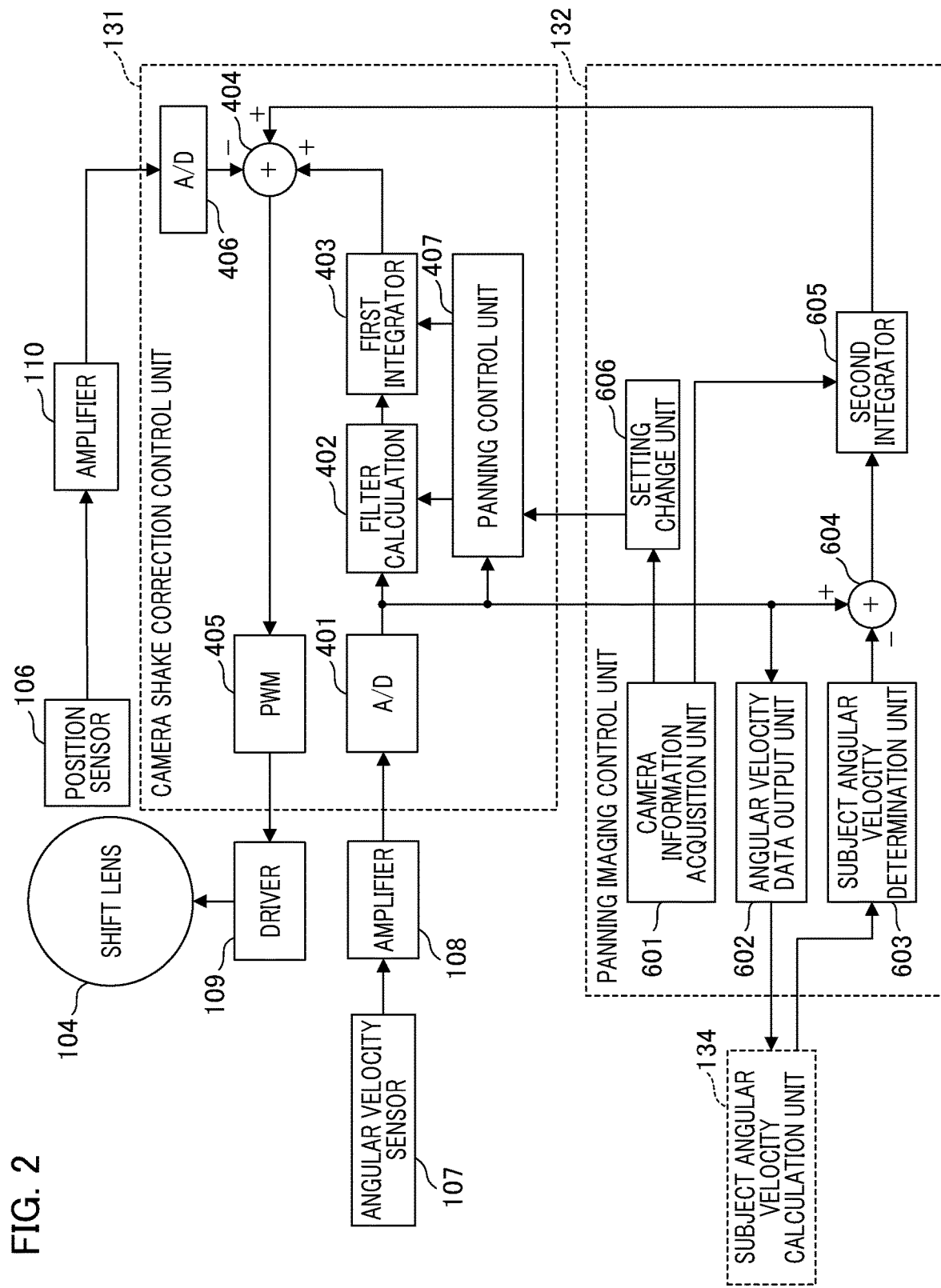
FIG. 2 is a configuration diagram of camera shake correction control and panning imaging assist control of the present embodiment.

FIG. 2 is a configuration diagram for explaining the camera shake correction control and the panning imaging assist control. Components the same as those of FIG. 1 are denoted by the same reference numerals already used, and descriptions thereof will be omitted. In the camera shake correction control unit 131, an analog/digital (A/D) converter 401 acquires a detection signal of the angular velocity sensor 107 amplified by the amplifier 108 and converts the detection signal into a digital signal. A data sampling of an output of the angular velocity sensor 107 is performed at about 1 to 10 kHz. A filter calculation unit 402 includes a high pass filter (HPF) or the like and performs calculation processing on an output of the A/D converter 401. The filter calculation unit 402 removes an offset component included in the output of the angular velocity sensor 107. In addition, the filter calculation unit 402 changes a cutoff frequency of the HPF to perform processing for a countermeasure in panning. A first integrator 403 integrates an output of the filter calculation unit 402 and converts angular velocity data into angular displacement data in order to generate drive target data of the shift lens. An output of the first integrator 403 is transmitted to an adder 404. In addition, in the present specification, a calculation performed by the adder includes not only an addition but also a subtraction that is an addition of a negative value.

A panning control unit 407 acquires the output of the A/D converter 401 and determines whether or not panning of the imaging apparatus 100 is being performed from a state of the angular velocity data. In a case where it is determined that panning is being performed, the panning control unit 407 performs change control of the cutoff frequency of the filter calculation unit 402 and an output adjustment of the first integrator 403.

The A/D converter 406 acquires an output of the position sensor 106 through the amplifier 110 and converts the output of the position sensor 106 into digital data. The adder 404 performs a calculation by receiving the output of the first integrator 403 as a positive input and the output of the A/D converter 406 as a negative input. That is, actual drive data of the shift lens is calculated by subtracting a detection value of a current shift lens position from the drive target value of the shift lens. Note that data of the positive input acquired by the adder 404 from the panning imaging control unit 132 will be described later. A pulse width modulation (PWM) output unit 405 acquires an output of the adder 404 and outputs a control signal corresponding to calculated driving amount data to the driver 109 for shift lens driving.

Figure 3:
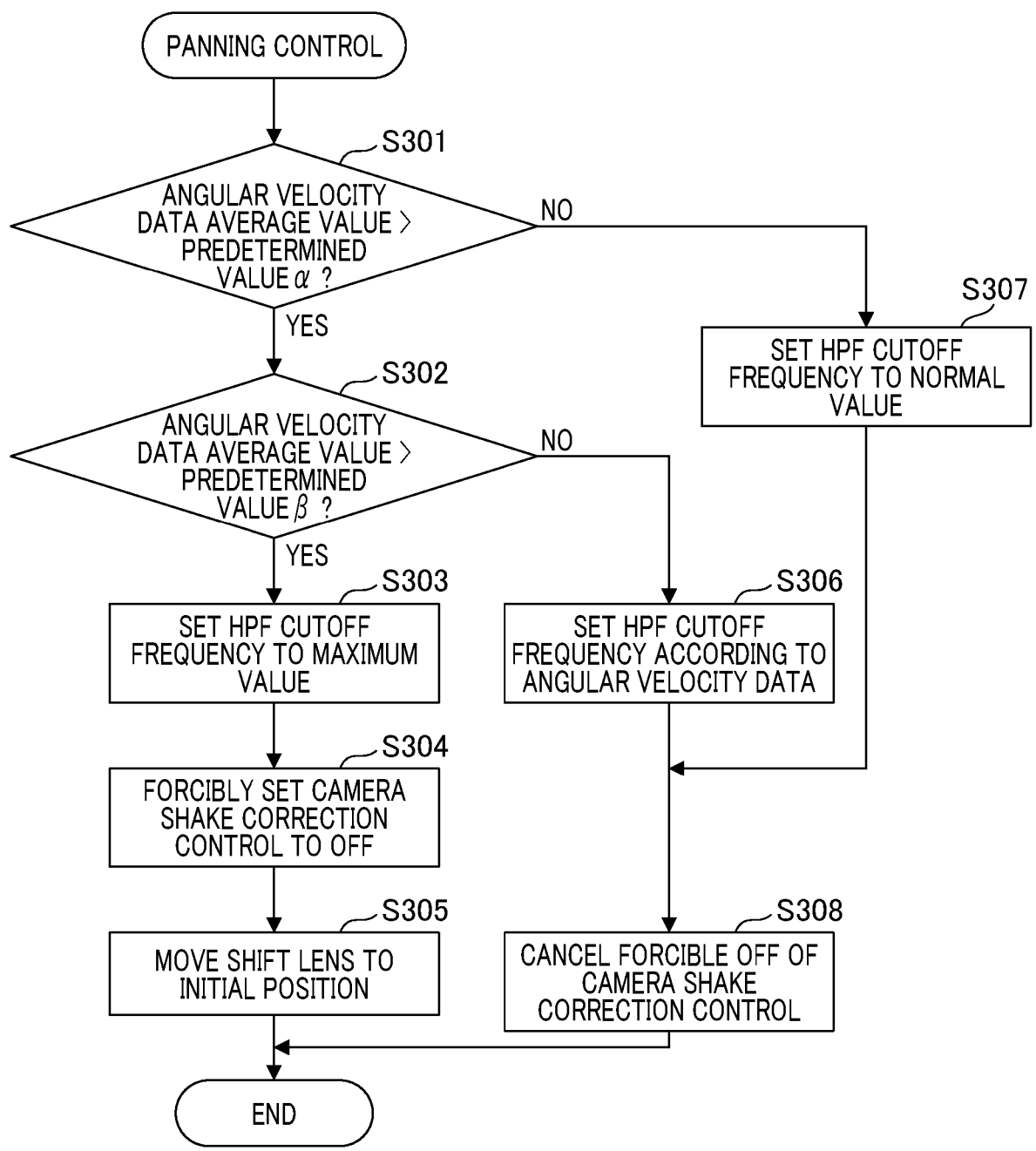
FIG. 3 is a flowchart of panning control.

The panning control will be described with reference to FIG. 3. FIG. 3 is a flowchart illustrating an example of processing performed by the panning control unit 407. Hereinafter, the panning control of a case where the user performs the panning operation as a change operation of an imaging direction will be described, but the same is also applied to a case of tilting control.

In S301, the panning control unit 407 calculates an average value (an average value corresponding to a predetermined number of sampling times) of the angular velocity data acquired from the A/D converter 401 and compares the average value with a predetermined value (denoted by α). The predetermined value α is a threshold value that is set in advance. In a case where it is determined that the average value of the angular velocity data is greater than the predetermined value α, the processing proceeds to S302. In a case where it is determined that the average value of the angular velocity data is equal to or less than the predetermined value α, it is determined that a panning operation is not being performed and the processing proceeds to S307.

In S302, the panning control unit 407 determines whether or not the average value of the angular velocity data acquired from the A/D converter 401 is greater than a predetermined value (denoted by β). The predetermined value β is a threshold value that is set in advance and is set as "α<β". In a case where it is determined that the average value of the angular velocity data is equal to or less than the predetermined value β, it is determined that a slow panning operation is being performed, and the processing proceeds to S306. In addition, in a case where it is determined that the average value of the angular velocity data is greater than the predetermined value β, it is determined that a fast panning operation is being performed, and the processing proceeds to S303.

In step S303, the panning control unit 407 sets the cutoff frequency of the high pass filter in the filter calculation unit 402 to a maximum value. Next, in step S304, the panning control unit 407 forcibly sets the camera shake correction control to an off state. Since the control is performed so that the shift lens gradually stops by increasing the cutoff frequency of the high pass filter, it is possible to reduce a sense of discomfort given to the user from an image when the camera shake correction control is turned off. In addition, at a time of a fast panning operation, a movement amount in the panning becomes very large with respect to a size of the camera shake. Therefore, even though an effect of the camera shake remains due to turning off of the camera shake correction control, there is no sense of discomfort. Without such setting, in a case where the imaging apparatus corrects for large blurring with respect to shake during a panning operation, although the movement of the image stops at the start of the panning operation, thereafter, there is a likelihood that the movement in the image will suddenly become great. The reason for this is that the image suddenly moves greatly at the moment when the shift lens group 104 reaches a correction end (a limit position of a control range) and thus the image appears to the user with a very unnatural movement. In order to avoid this phenomenon, the setting in S303 is performed.

After S304, in S305, control for moving the shift lens group 104 to an initial position is performed. That is, processing of gradually changing the output of the first integrator 403 of FIG. 2 to data of the initial position from current data is executed, and thus the shift lens group 104 moves to the initial position. This is because it is desirable that the position of the shift lens be the initial position of the drive range in a case where a next camera shake correction operation is restarted.

In step S302, in a case where the average value of the angular velocity data is equal to or less than the predetermined value β, the processing proceeds to S306. The panning control unit 407 determines that a slow panning operation is being performed. In S306, the panning control unit 407 sets the cutoff frequency of the high pass filter in the filter calculation unit 402 according to the magnitude of the angular velocity data. This is because it is impossible to ignore all effects of the camera shake in a case where the slow panning operation is being performed. The processing of S306 is processing necessary for performing the camera shake correction while maintaining a tracking ability in the image at the time of the panning operation to an extent which does not become unnatural.

In S301, in a case in which the average value of the angular velocity data is equal to or less than the predetermined value α, the processing proceeds to S307. The panning control unit 407 determines that the panning operation is not being performed. In S307, the panning control unit 407 sets the cutoff frequency of the high pass filter in the filter calculation unit 402 to a normal value that is set in advance. After S306 and S307, the processing proceeds to S308, and the panning control unit 407 cancels the forcible OFF setting of the camera shake correction control. After S305 or S308, a series of processes is ended.

Figure 4:
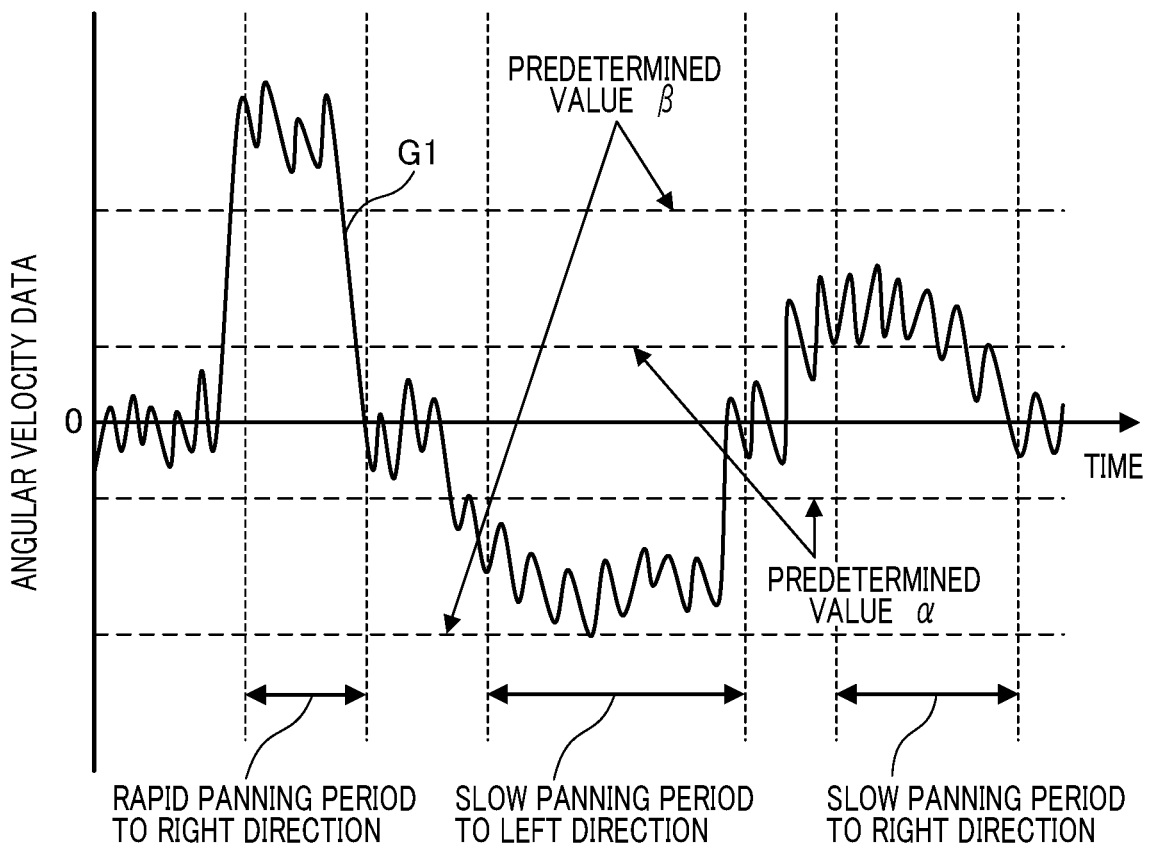
FIG. 4 is an explanatory diagram for panning determination.

The panning operation will be described specifically with reference to FIG. 4. FIG. 4 is a diagram illustrating a relationship between the angular velocity data in a lateral direction at the time of the panning operation and the predetermined values α and β. A horizontal axis represents a time axis and a vertical axis represents the angular velocity data. A graph G1 shows a change over time of the angular velocity data (sampling data). In this example, in a case of panning in a rightward direction, the output is in a + direction, and in a case of panning in a leftward direction, the output is in a − direction. In addition, an initial value of the angular velocity data is set as zero. In FIG. 4, an example in which rapid panning in the rightward direction and slow panning in the leftward and rightward directions are detected is shown. In a period of the rapid panning in the rightward direction, the magnitude of the angular velocity data exceeds the predetermined value β. In a period of the slow panning in the leftward direction or the rightward direction, the magnitude of the angular velocity data is less than the predetermined value β that is greater than the predetermined value α.

During the panning operation, the angular velocity data deviates greatly from the initial value. Therefore, in a case where the drive target value of the shift lens is calculated by integrating the angular velocity data, there is a possibility that the output of the integrator will become a very large value due to a DC offset component (a direct current component) and the control will be disabled. Therefore, in a case where the panning operation is detected, it is necessary to cut off the DC offset component by changing the cutoff frequency of the high pass filter to a higher frequency side. In a case of the rapid panning operation, since the output of the integrator increases, setting for further increasing the cutoff frequency is performed. Especially, in a case where the panning speed is high, the motion of the image due to the panning speed becomes very large with respect to the camera shake. Therefore, even in a case where the camera shake correction function is turned off with respect to the panning direction, especially, a sense of discomfort does not occur. It is possible to perform monitoring display for an image in which a sense of discomfort does not occur even during a panning operation by performing the panning control as described above.

Next, the control in a case where the panning imaging assist mode is set by the operation unit 116 will be described. The motion vector detection unit 135 (FIG. 1) in the camera signal processing circuit 114 detects the motion vector of the subject from image information after imaging and outputs the motion vector to the subject angular velocity calculation unit 134 of the control unit 130.

The subject angular velocity calculation unit (hereinafter, simply referred to as a calculation unit) 134 acquires information on the angular velocity data detected by the angular velocity sensor 107 and the focal distance detected by the zoom encoder 105. The calculation unit 134 calculates an angular velocity (hereinafter, referred to as a main subject angular velocity) corresponding to a main subject using the motion vector, the angular velocity, and the focal distance. The calculation unit 134 transfers information that is a combination of the calculated main subject angular velocity and an imaging time at which the image at the time of the calculation is generated to the panning imaging control unit 132. The panning imaging control unit 132 performs drive control of the shift lens group 104 through the driver 109 based on the acquired main subject angular velocity and performs a subject blur correction operation.

Here, a method of calculating the main subject angular velocity will be described. Regarding the motion vector of the subject output from the motion vector detection unit 135 during the panning imaging, there are two types of vector including a vector (hereinafter, referred to as a main subject vector) corresponding to the main subject to be photographed by a photographer and a vector (hereinafter, referred to as a background vector) corresponding to a background. First, processing of converting the angular velocity data into a movement amount (hereinafter, referred to as an image surface movement amount) on an image surface is performed using a difference between the times at which the two images used for vector detection were generated and the focal distance. Since both speeds related to the angular velocity data and the background vector are equal to the panning speed of the imaging apparatus 100, the image surface movement amount obtained by converting the angular velocity data coincides with the background vector. That is, it is possible to determine the background vector by using the image surface movement amount and it is determined that a vector other than the background vector is the main subject vector.

Next, processing of converting the main subject vector into the angular velocity data corresponding to the main subject is performed by using the focal distance and the time difference used when converting the angular velocity data into the image surface movement amount. The converted angular velocity data corresponds to the difference between the panning speed of the imaging apparatus 100 and the main subject angular velocity. Therefore, it is possible to calculate data of the main subject angular velocity by adding the angular velocity data detected by the angular velocity sensor 107 and the angular velocity data corresponding to the main subject.

The shift lens drive control at the time of the panning imaging assist mode will be described with reference to FIG. 2. A camera information acquisition unit 601 acquires various kinds of camera information. The camera information is setting information, release information, or the like of the panning imaging assist mode. In a case where the panning imaging assist mode is set by the operation unit 116, the camera information acquisition unit 601 acquires the setting information thereof and outputs the setting information to a setting change unit 606. The setting change unit 606 executes setting change processing of the panning control unit 407 according to the setting information of the panning imaging assist mode. For example, a setting change for easily shifting to the rapid panning state may be performed. Specifically, the predetermined values α and β for the panning determination described above are changed.

An angular velocity data output unit 602 acquires the angular velocity data detected by the angular velocity sensor 107 from the A/D converter 401 and outputs the angular velocity data to the calculation unit 134. The calculation unit 134 calculates the main subject angular velocity using the angular velocity data and outputs the main subject angular velocity to a subject angular velocity determination unit 603. The subject angular velocity determination unit (hereinafter, simply referred to as a determination unit) 603 determines a subject angular velocity at a time of an exposure from the main subject angular velocity in consideration of a time taken to calculate the main subject angular velocity, a time of a release time lag, and an exposure time. The determined subject angular velocity at the time of the exposure is output to an adder 604. On the other hand, in a case where it is impossible to detect the main subject, a case where a detection accuracy is not sufficient, or the like, the camera shake correction control unit 131 outputs a control value the same as that of camera shake control of a normal mode to the adder 604. Note that details of processing of the determination unit 603 will be described later.

The adder 604 performs a subtraction by receiving the output of the A/D converter 401 as a positive input and an output of the determination unit 603 as a negative input. A difference between the angular velocity data detected by the angular velocity sensor 107 and the subject angular velocity is calculated and transmitted to a second integrator 605. The second integrator 605 starts an integration operation according to a signal indicating the exposure period acquired by the camera information acquisition unit 601 and outputs a value at which a position of the shift lens is a center of a movable range in other periods. Here, in a case where the panning imaging control unit 132 attempts to move the shift lens to the central position of the movable range in a period other than the exposure period, the shift lens rapidly moves from the current shift lens position to the central position at an end of the exposure period. However, a period immediately after the end of the exposure period is a period during which the image disappears on a display screen in order to read a signal from the imaging element, and the motion of the image due to the rapid movement of the shift lens is not a problem.

In a case where the panning imaging is actually performed by the photographer in a state in which the panning imaging assist mode is set, the panning control unit 407 immediately performs the panning control for the rapid panning operation. At this time, the shake correction operation is prohibited by performing control so that the output of the first integrator 403 is not transmitted to the adder 404. Instead, an output of the second integrator 605 in the panning imaging control unit 132 is transmitted to the adder 404. The adder 404 performs a subtraction by receiving the output of the second integrator 605 as a positive input and the output of the A/D converter 406 as a negative input and calculates a driving amount of the shift lens. That is, the driving amount of the shift lens corresponds to an image blur correction amount and is an amount corresponding to the difference between the angular velocity at the time of the panning of the camera and the main subject angular velocity. Therefore, the difference between the panning angular velocity of the camera and the subject angular velocity during the exposure period is canceled out by the movement of the shift lens according to the image blur correction amount, and as a result, a probability of success for the panning imaging is increased.

Figure 5:
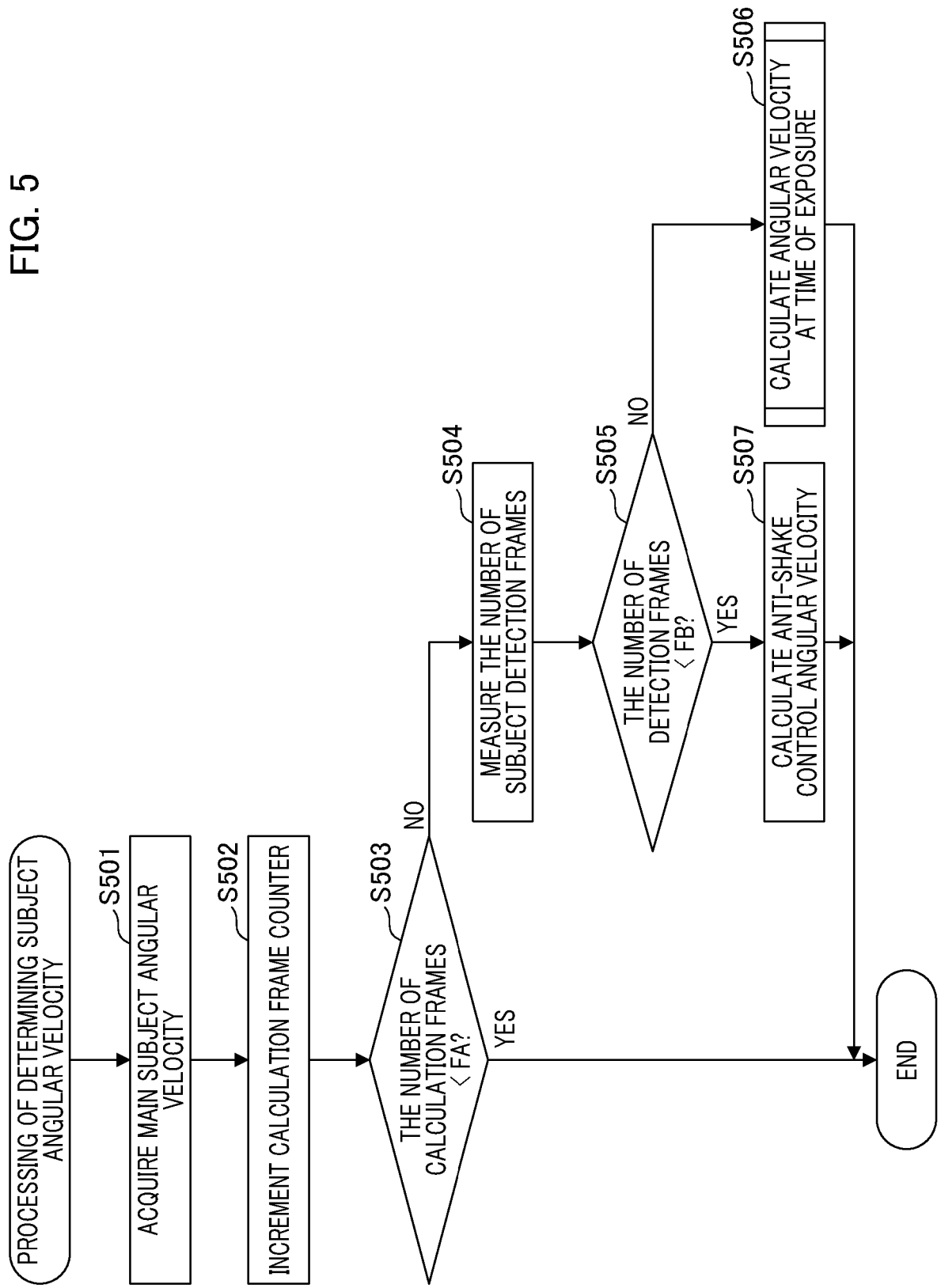
FIG. 5 is a flowchart of processing of determining a subject angular velocity of the present embodiment.

Next, processing of determining the subject angular velocity will be described with reference to FIG. 5. FIG. 5 is a flowchart of processing performed by the determination unit 603. The processing of determining the subject angular velocity is executed each time the calculation unit 134 calculates the main subject angular velocity.

In S501, the determination unit 603 acquires the main subject angular velocity from the calculation unit 134 and stores the main subject angular velocity in a memory. Next, in S502, the determination unit 603 increments a counter (hereinafter, referred to as a calculation frame counter) for counting the number of frames of a captured image. It is assumed that the calculation frame counter is reset to an initial value of zero at a time of startup of the imaging apparatus 100 or at a time at which an execution of a photographing operation is started. After a value of the calculation frame counter is incremented by one, in S503, it is determined whether or not the value of the calculation frame counter is less than a first threshold value (denoted by FA). In a case where the counter value is less than the FA, the processing of determining the subject angular velocity is ended. At this time, since the control value from the determination unit 603 is not output to the adder 604, it is possible to perform control so that the photographing operation is not performed. In addition, in a case where the counter value is equal to or greater than the threshold value, the processing proceeds to S504.

In S504, the number of subject detection frames is measured. The number of the subject detection frames means the number of frames in which the main subject angular velocity is normally detected in a frame of a latest predetermined number (for example, the FA). Note that there are a method of setting a measurement range at a fixed number of frames and a method of variably setting the measurement range according to the focal distance or the panning angular velocity.

Next, in S505, it is determined that the number of the subject detection frames is less than a second threshold value (denoted by FB). The threshold value FB for the determination is a fixed value or a variable value that varies according to the number of measurement frames in a case where the measurement range changes. For example, it is assumed that the threshold value FB is less than the FA (FB<FA). In a case where the number of the subject detection frames is less than the FB, the processing proceeds to S507 and in a case where the number of the subject detection frames is equal to or greater than the threshold value, the processing proceeds to S506.

In step S507, the determination unit 603 calculates an anti-shake control angular velocity. A value of the anti-shake control angular velocity may be an angular velocity value detected by the angular velocity sensor 107 or may be a specific angular velocity value such as 0 or 65535. For example, in a case where the angular velocity data detected by the angular velocity sensor 107 is used, both of the output of the adder 604 and the output of the second integrator 605 of FIG. 4 become zero. In this case, in the adder 404 of the camera shake correction control unit 131, since a contribution by the output of the panning imaging control unit 132 is eliminated, the same processing as in a case of a normal camera shake correction control is executed.

In addition, in S506, the determination unit 603 calculates the angular velocity at the time of the exposure. After S506 or S507, the processing of determining the subject angular velocity is ended. Processing of calculating the angular velocity at the time of the exposure in S506 will be described with reference to FIG. 6.

Figure 6:
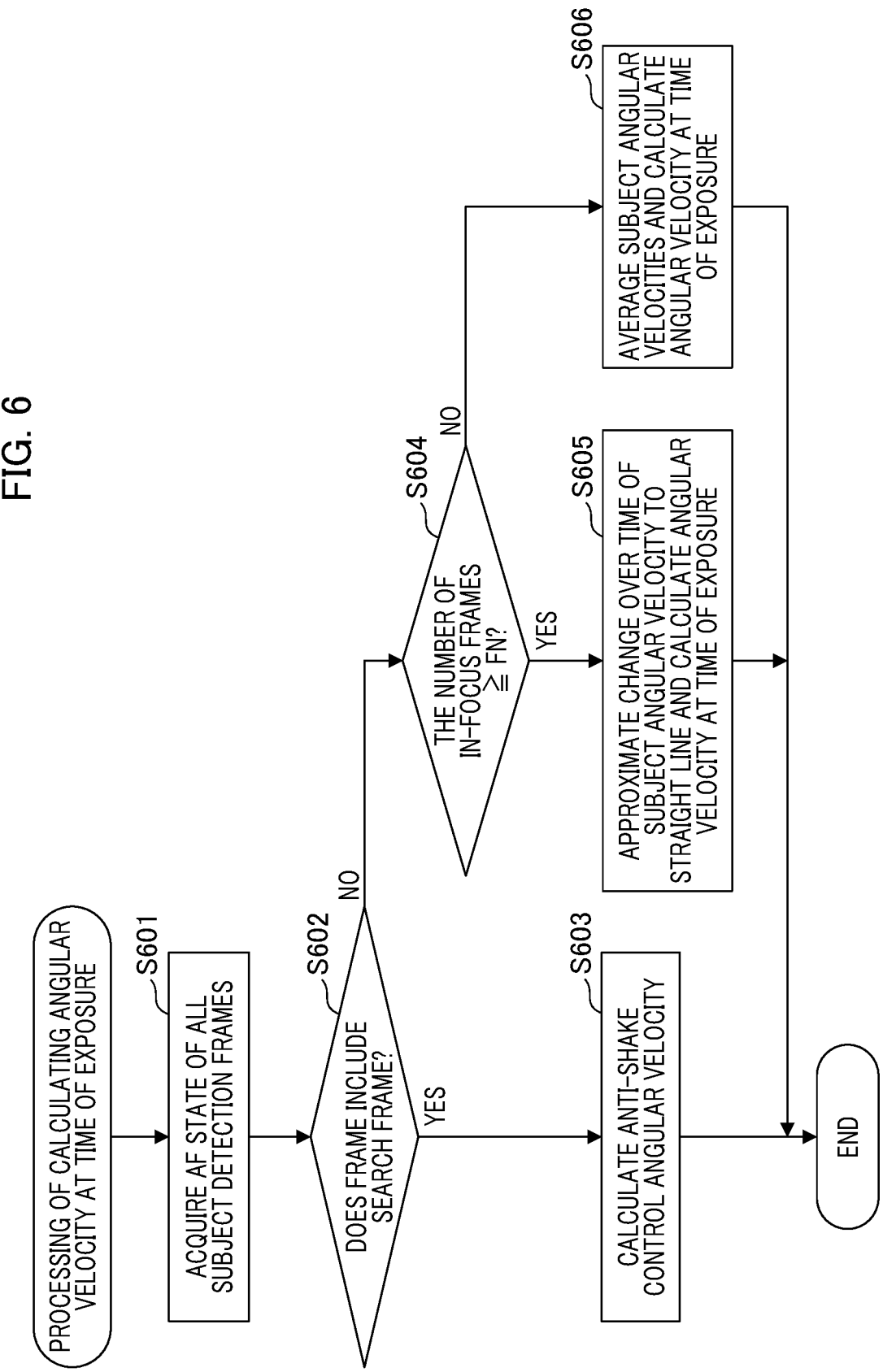
FIG. 6 is a flowchart of processing of calculating an angular velocity at a time of an exposure of a first embodiment.

FIG. 6 is a flowchart of the processing of calculating the angular velocity at the time of the exposure. In S601, processing of acquiring an autofocus (AF) state for all subject detection frames is executed. The AF state includes an in-focus state in which the subject is in focus and an out-of-focus state in which the subject is out of focus. In the out-of-focus state, there are a search state in which the subject is searched by driving a focus lens included in the main imaging optical system 102 and a non-search state in which the search for the subject is not performed. In the present specification, a frame in which the subject is detected in the in-focus state is referred to as an in-focus frame and a frame in which the subject is detected in a state in which the focus lens is being driven is referred to as a search frame. A frame in which the subject is detected in a state in which the focus lens is not driven is referred to as a missing frame.

Since the main subject angular velocity in the in-focus frame is the angular velocity calculated from the motion vector detected in the in-focus state, the reliability is relatively high. On the other hand, since the main subject angular velocity in the search frame is the angular velocity calculated from the motion vector detected in the out-of-focus state, the reliability is relatively low. With respect to the subject angular velocity in the missing frame, the motion vector detected in the in-focus state and the motion vector detected in the out-of-focus are highly likely to be mixed and the subject angular velocity in the missing frame is calculated from such motion vectors. The state in which the subject is in focus in the missing frame is, for example, a state in which the subject is detected outside a determination region and inside a detection region of the motion vector in a case where the detection region of the motion vector is wider than the determination region of the focus state with respect to the captured image. In either case, the reliability of the main subject angular velocity is not very high. Note that the reliability is able to be calculated by a known method from an image deviation amount of an AF image, a defocus amount, or the like. In the present embodiment, the calculation method is arbitrary.

Next, in S602, the determination unit 603 determines whether or not the search frame is included in a frame of a detection target. In a case where the search frame is included in the frame of the detection target, the processing proceeds to S603, and in a case where the search frame is not included in the frame of the detection target, the processing proceeds to S604. In S603, the anti-shake control angular velocity is calculated similarly to S507 of FIG. 5.

In S604, the determination unit 603 determines whether or not the number of the in-focus frames included in the frame of the detection target is equal to or greater than a predetermined threshold value (denoted by FN). For example, the threshold value FN is equal to the second threshold value FB. In a case where the number of the in-focus frames is equal to or greater than the threshold value, the processing proceeds to S605, and in a case the number of the in-focus frames is less than the threshold value, the processing proceeds to S606.

In S605, the determination unit 603 calculates the angular velocity (the main subject angular velocity) at the time of the exposure by approximating the change over time of the main subject angular velocity to a straight line. That is, the subject angular velocity at the time of the exposure is calculated by approximating the change over time of the angular velocity to the straight line using the subject angular velocity in the in-focus frame of which the reliability is high.

On the other hand, in S606, the determination unit 603 calculates the angular velocity at the time of the exposure by calculating the average value of the acquired main subject angular velocity. That is, in a case where the main subject angular velocity of which the reliability is not so high is used, the angular velocity at the time of the exposure is calculated as the average value of all acquired main subject angular velocities.

In the present embodiment, in the panning imaging of the subject having an angular acceleration, processing of switching a method of calculating the angular velocity at the time of the exposure according to the AF state (a focus detection state) is performed. In a case where such processing is not performed, for example, it is assumed that a captured image of the in-focus frame is acquired in a first AF state and a captured image of the missing frame is acquired in a subsequent second AF state. In this case, the captured image of the in-focus frame of the two captured images is in focus on the subject and the reliability of the image data is high. On the other hand, the reliability of the captured image of the missing frame of the two captured images is not so high. Therefore, in a case where the motion vector is detected by a comparison of the image data, a detection error occurs, and it is difficult to accurately predict the subject angular velocity at the time of the exposure.

In the present embodiment, in a case where the number of the in-focus frames is equal to or greater than the threshold value and the image data of the in-focus state of which the reliability is high is acquired, it is possible to accurately predict the angular velocity at the time of the exposure. On the other hand, in a case where the number of the in-focus frames is less than the threshold value and the image data of which the reliability is not sufficient is acquired, the angular velocity at the time of the exposure is calculated by an averaging calculation. According to the present embodiment, it is possible to perform the image blur correction by calculating the angular velocity at the time of the exposure from the subject angular velocity of which the reliability is high, while reducing a possibility of erroneous image blur correction by predicting the angular velocity at the time of the exposure with a linear approximation on the basis of the subject angular velocity of which the reliability is low.

Second Embodiment

Next, the second embodiment of the present invention will be described. In the first embodiment, in a case where the number of the in-focus frames is equal to or less than the predetermined threshold value, the angular velocity at the time of the exposure is calculated by the average value of the angular velocities. In the present embodiment, in a case where both of the missing frame and the in-focus frame are present, the in-focus frame is evaluated intensively for the missing frame. In the present embodiment, the detailed description of the same configuration as that of the first embodiment will be omitted and the differences will be described.

Figure 7:
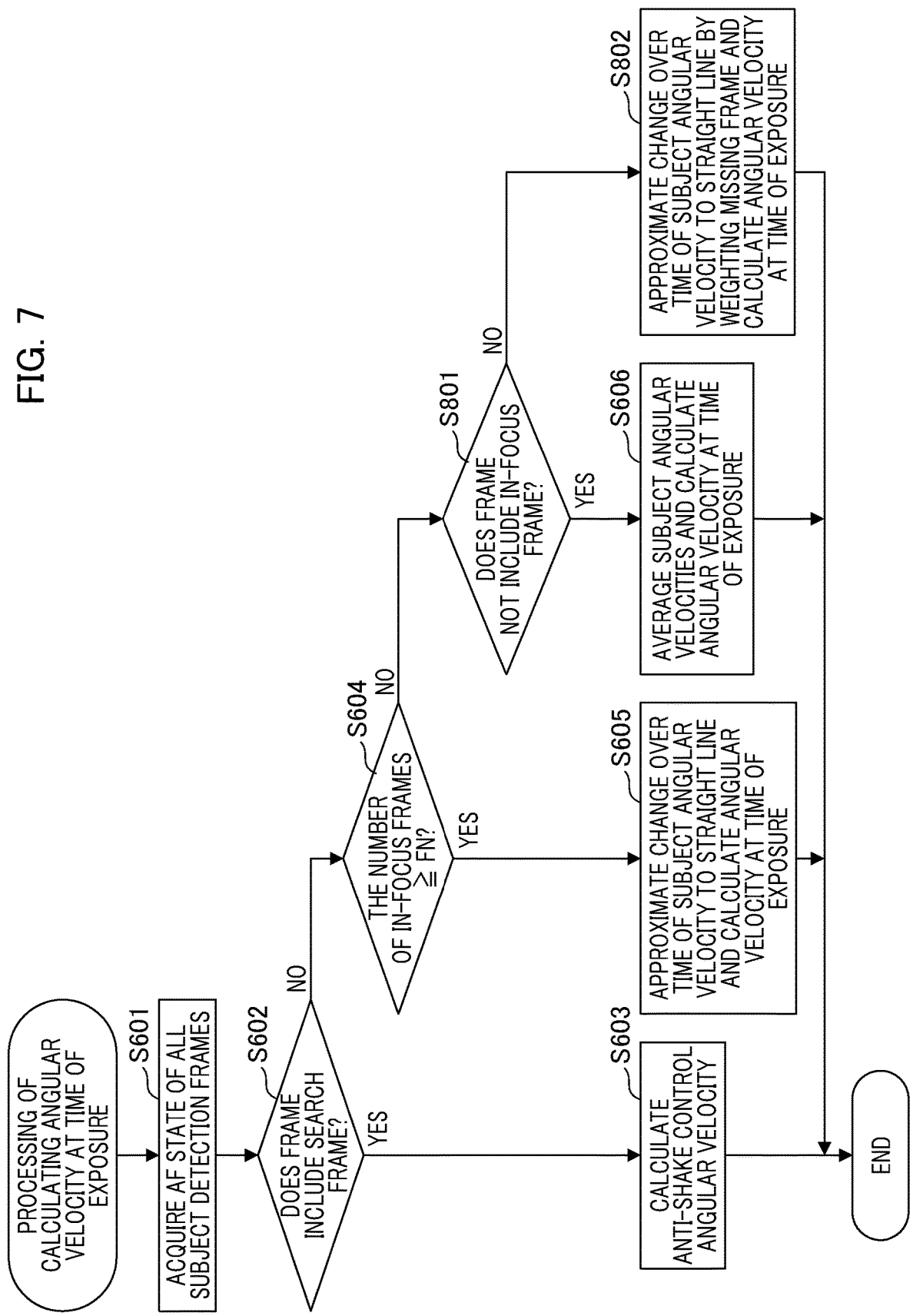
FIG. 7 is a flowchart of processing of calculating an angular velocity at a time of an exposure of a second embodiment.

In the present embodiment, in the processing of calculating the angular velocity at the time of the exposure of FIG. 6, processing is added before S606. FIG. 7 is a flowchart of the processing of calculating the angular velocity at the time of the exposure and the processing different from FIG. 6 is processing of S801 and S802.

In a case where the processing proceeds from S604 to S801 (No in S604), the determination unit 603 determines whether or not the in-focus frame is included in the frame of the detection target. In a case where the in-focus frame is not included in the frame of the detection target, the processing proceeds to S606. In addition, in a case where the in-focus frame is included in the frame of the detection target, the processing proceeds to S802.

In S802, the determination unit 603 weights the missing frame and the in-focus frame to evaluate the in-focus frame relatively high, and determines the angular velocity at the time of the exposure using the main subject angular velocity in the missing frame and the in-focus frame. That is, the angular velocity at the time of the exposure is calculated by multiplying the main subject angular velocity by a weighting coefficient according to the reliability of the angular velocity data and by approximating the change over time of the multiplied angular velocity to a straight line. In the present embodiment, the reliability of the data is evaluated to calculate the angular velocity at the time of the exposure from the subject angular velocity. Therefore, the image blur correction is performed. Accordingly, it is possible to realize the panning imaging assist with a higher success probability.

According to the present embodiment, in the panning imaging of the subject moving with the angular acceleration, an acceleration amount is predicted in consideration of the AF state. Therefore, it is possible to suppress an incorrect prediction of the subject angular velocity due to the detection error of the motion vector and perform a preferable image blur correction.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2017-204470, filed Oct. 23 2017, which is hereby incorporated by reference wherein in its entirety.

What is claimed is:

1. An image blur correction device for performing an image blur correction by correction unit on an image of a subject formed through an imaging optical system, the image blur correction device comprising:
at least one processor and at least one memory functioning as:
acquisition unit configured to acquire information on a focal distance of the imaging optical system;
calculation unit configured to calculate an angular velocity of the subject with respect to the image blur correction device based on the focal distance, a shake detection signal detected by first detection unit, and motion information of the subject detected by second detection unit;
determination unit configured to determine the angular velocity of the subject at a time of an exposure based on a plurality of angular velocities acquired from the calculation unit and a time at which the image used when the angular velocity is calculated is generated; and
control unit configured to control the correction unit according to a correction amount calculated based on the angular velocity determined by the determination unit,
wherein the determination unit switches between first processing of determining the angular velocity of the subject at the time of the exposure based on a change over time of a plurality of angular velocities of the subject calculated by the calculation unit and a second processing of determining the angular velocity of the subject at the time of the exposure by averaging the plurality of angular velocities of the subject calculated by the calculation unit.

2. The image blur correction device according to claim 1, wherein the determination unit determines the angular velocity of the subject at the time of the exposure by approximating the change over time of the plurality of angular velocities of the subject to a straight line in the first processing.

3. The image blur correction device according to claim 1, wherein, in a case where a search frame at a time when a motion of the subject is detected in a search state for searching for the subject is included in a frame of the image that is a detection target, the determination unit determines the angular velocity of the subject at the time of the exposure as an angular velocity based on an output of the first detection unit or an angular velocity that is set in advance.

4. The image blur correction device according to claim 3, wherein, in a case where the search frame is not included in the frame of the image that is the detection target and the number of in-focus frames at the time when the motion of the subject is detected in an in-focus state in which the subject is in focus is equal to or greater than a threshold value, the determination unit performs the first processing.

5. The image blur correction device according to claim 4, wherein, in a case where the search frame is not included in the frame of the image that is the detection target and the number of in-focus frames is less than the threshold value, the determination unit performs the second processing.

6. The image blur correction device according to claim 3, wherein, in a case where the search frame is not included in the frame of the image that is the detection target and the number of in-focus frames at the time when the motion of the subject is detected in an in-focus state in which the subject is in focus is less than a threshold value, the determination unit determines whether or not an in-focus frame is included in the frame of the image that is the detection target, and in a case where the in-focus frame is included in the frame of the image that is the detection target, the determination unit performs the first processing using a frame at a time when the subject is detected in a state in which a focus lens is not being driven and an angular velocity of the subject weighted with respect to the angular velocity acquired at the in-focus frame.

7. The image blur correction device according to claim 1, wherein the determination unit switches between the first processing and the second processing on the basis of a focus detection state at a time when the plurality of angular velocities of the subject are calculated by the calculation unit.

8. The image blur correction device according to claim 1, wherein the determinations unit determines a focus detection state at a time when the plurality of angular velocities of the subject are calculated by the calculation unit, performs the first processing in a case where a reliability of the calculated angular velocity of the subject is relatively high, and performs the second processing in a case where the reliability of the calculated angular velocity of the subject is relatively low.

9. The image blur correction device according to claim 1, wherein the correction unit includes a correction lens for correcting an image blur.

10. The image blur correction device according to claim 1, wherein the processor functions as setting unit configured to set a mode for supporting a panning imaging, and
in a case where the mode is set, the determination unit determines the angular velocity of the subject at the time of the exposure.

11. An image blur correction device comprising:
at least one processor and at least one memory functioning as:

detection unit configured to detect information related to a motion of a subject by using a plurality of images; and calculation unit configured to calculate a correction amount of correcting unit for correcting an image blur using a plurality of the information related to the motion of the subject detected by the detection unit, wherein the calculation unit changes calculation processing on the correction amount according to a reliability of the plurality of the information related to the motions of the subject.

12. The image blur correction device according to claim 11, wherein the calculation unit selectively executes first calculation processing of calculating the correction amount on the basis of a temporal change in the plurality of the information related to the motion of the subject and second calculation processing of calculating the correction amount on the basis of an average value of the plurality of the information related to the motion of the subject according to the reliability of the plurality of the information related to the motion of the subject.

13. The image blur correction device according to claim 12, wherein, in a case where the reliability of the plurality of the information related to the motion of the subject is relatively high, the calculation unit executes the first calculation processing.

14. The image blur correction device according to claim 13, wherein, in a case where a focus control state at a time at which a plurality of images used for detecting the plurality of the information related to the motion of the subject are captured is in a state in which the subject is in focus, the calculation unit determines that the reliability of the plurality of the information related to the motion of the subject is relatively high.

15. The image blur correction device according to claim 12, wherein, in a case where the reliability of the plurality of the information related to the motion of the subject is relatively low, the calculation unit executes the second calculation processing.

16. The image blur correction device according to claim 15, wherein, in a case where a focus control state at a time at which a plurality of images used for detecting the plurality of the information related to the motion of the subject are captured is in a state in which the subject is not in focus, the calculation unit executes the second calculation processing.

17. The image blur correction device according to claim 12, wherein the calculation unit calculates the correction amount by linearly approximating the change over time in the plurality of the information related to the motion of the subject in the first calculation processing.

18. The image blur correction device according to claim 12, wherein the calculation unit calculates the correction amount using the plurality of the information related to the motion of the subject detected by the detection means during a panning operation.

19. A control method executed in an image blur correction device for performing an image blur correction by correction unit on an image of a subject formed through an imaging optical system, the control method comprising:

acquiring information on a focal distance of the imaging optical system;

detecting a shake by first detection unit and detecting a motion of the subject from the image by the second detection unit;

calculating an angular velocity of the subject with respect to the image blur correction device based on the focal distance, a shake detection signal and motion information of the subject detected by the first and second detection unit;

determining the angular velocity of the subject at a time of an exposure based on a plurality of calculated angular velocities and a time at which the image used when the angular velocity is calculated is generated; and controlling the correction unit according to a correction amount calculated based on the determined angular velocity, wherein, in determining, first processing of determining the angular velocity of the subject at the time of the exposure based on a change over time of a plurality of angular velocities of the subject calculated in calculating and a second processing of determining the angular velocity of the subject at the time of the exposure by averaging the plurality of angular velocities calculated in calculating are switched between.

* * * * *